United States Patent
Schwarzbeck

[15] 3,698,539
[45] Oct. 17, 1972

[54] TORQUE CONTROLLED POWER ROLLER FOR CONVEYOR SYSTEM

[72] Inventor: John G. Schwarzbeck, Downey, Calif.

[73] Assignee: Western Gear Corporation, Lynwood, Calif.

[22] Filed: July 6, 1971

[21] Appl. No.: 160,078

Related U.S. Application Data

[63] Continuation of Ser. No. 826,466, May 21, 1969, abandoned.

[52] U.S. Cl..................................198/127, 74/242.9
[51] Int. Cl................................................B65g 13/02
[58] Field of Search......198/127, 103, 105; 226/177; 74/242.9

[56] References Cited

UNITED STATES PATENTS

| 2,753,724 | 7/1956 | Leyer et al............74/242.9 |
| 2,453,401 | 11/1948 | Beeching..................198/127 |
| 3,204,489 | 9/1965 | Furukawa et al............74/785 |

FOREIGN PATENTS OR APPLICATIONS

| 238,212 | 12/1959 | Australia....................198/127 |

Primary Examiner—Richard E. Aegerter
Assistant Examiner—H. S. Lane
Attorney—Huebner and Worrel

[57] ABSTRACT

Torque controlled power roller for conveyor system to move cargo or baggage containers, or other objects, over a conveyor platform, mountable below the plane of the platform supporting surface, with a power source which drives the roller and automatically lifts it into operating position through a transmission system embodying planetary gearing, the ring gear of the planetary set being arranged to provide force to lift the drive roller when the electric motor or other power source is started, and conversely allow the drive roller to drop out of engagement when the driving force ceases. The lifting force exerted is proportional to the driving torque on the roller; so that the more demanding the load, the more vertical up pressure forces will be imposed.

18 Claims, 6 Drawing Figures

INVENTOR.
JOHN G. SCHWARZBECK
By Huebner & Worrel
ATTORNEYS.

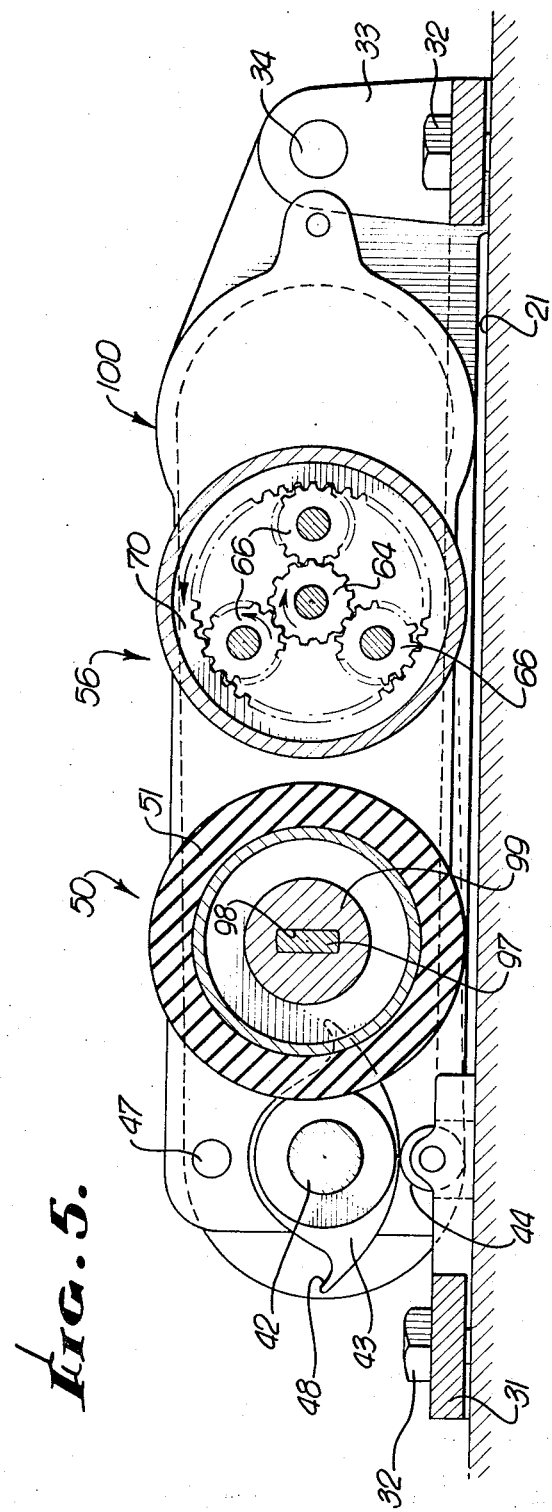
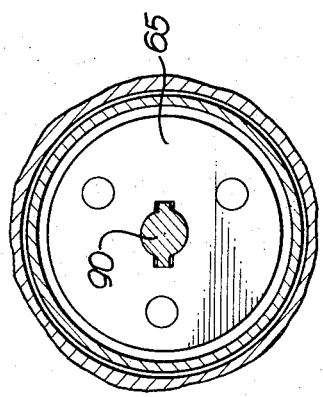
Fig. 5.
Fig. 6.
INVENTOR.
JOHN G. SCHWARZBECK
BY Huebner & Worrel
ATTORNEYS.

TORQUE CONTROLLED POWER ROLLER FOR CONVEYOR SYSTEM

This application is a continuation of Ser. No. 826,466, filed May 21, 1969, now abandoned.

BACKGROUND OF THE INVENTION

In handling cargo or baggage containers, or other objects, at air terminals, in loading or unloading planes, and in warehouses, platforms are sometimes employed which incorporate free rolling support members, such as rollers, inverted casters, large ball bearings or air lifts. The support members enable the containers to be moved, but ordinarily provide no moving power. Many containers can be pushed by hand, but large heavy containers or other objects are more conveniently transferred by rotary driven wheels or rollers. In the case of pneumatic tired power driven wheels mounted on permanently fixed axes, the tires may protrude above the plane of the conveyor system supporting surface and the tires yield under pressure of the containers to provide frictional driving contact. Such driven wheels offer certain advantages, but are not susceptible to low silhouette, compact construction of the unit. For the latter purpose a roller of relatively small diameter must be used and some means provided to position the roller in frictional contact with the bottom of the container, and preferably to lower it out of contact when not operating.

SUMMARY OF THE INVENTION

An object of the present invention is to provide a low silhouette and compact power roller unit for installation in a shallow recess of a platform conveyor system. The platform may be provided with rollers, balls, casters, air lift, or other support means enabling movement thereof of cargo or baggage containers, or other objects, transportable over the system.

The system may be installed inside aircraft, or adjacent thereto, or in warehouses, factories, or wherever shifting in relatively short increments is desired.

The power roller units may be spaced apart as desired, having reference to the length of the containers or objects to be moved, and the total distance of the intended travel.

The roller unit is designed, when idle, to rest on a sub-base and lie entirely below the horizontal plane of support of the system, but when the electric motor or other power source is started, torque generated through a modified planetary gear set is applied for forcing the drive roller up against the bottom of the container, and a gear train simultaneously drives the roller. The greater the resistance imposed on the roller by the container, the greater is the torque applied to push the drive roller against the container. The motor preferably is reversible, and the unit will function in either direction.

The objects are achieved in part by utilizing a modified planetary gear set in which the ring gear is not fixed but is operatively coupled to a butterfly cam, whereby torque from the ring gear will impart fractional rotation to the cam. When the cam is thus shifted in either direction, the end of the unit mounting the drive roller is elevated, the opposite end of the unit being pivotally anchored.

The planetary gear set also drives the roller through a reduction gear train.

BRIEF DESCRIPTION OF THE DRAWINGS

FIG. 5 is a section taken on the line 5—5 of FIG. 4.

FIG. 6 is a section taken on the line 6—6 of FIG. 4.

DESCRIPTION OF THE PREFERRED EMBODIMENT

Figure 1:
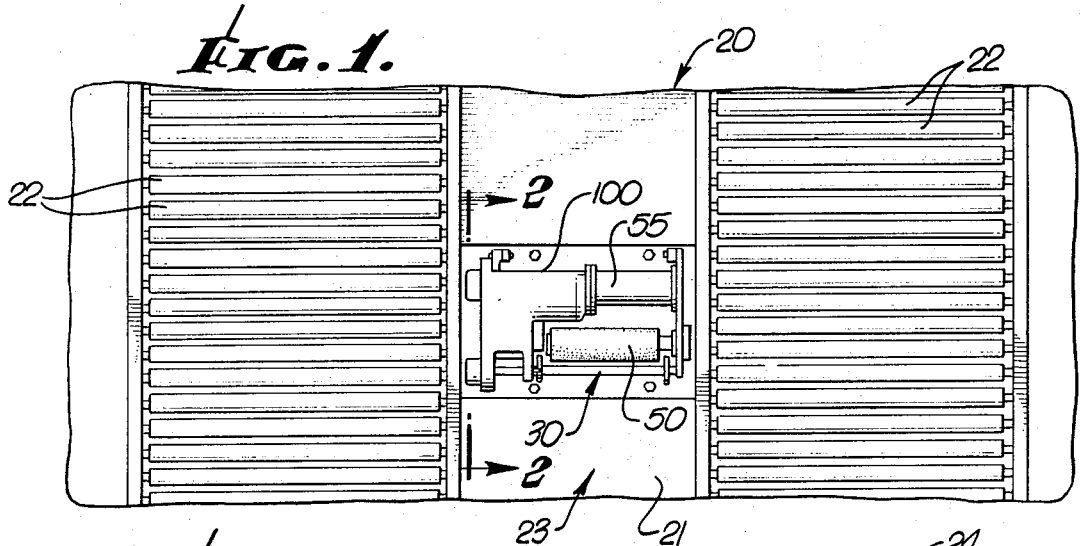
FIG. 1 is a top plan view of a roller conveyor system, with the drive roller unit installed.

Referring to FIG. 1, a conveyor system is shown by way of example as comprising a platform 20 which includes a subbase 21 upon which are mounted a plurality of idle rollers 22, illustrated as arranged in parallel reaches spaced on each side of a central aisle 23. The rollers are arranged so that their upper peripheral portions lie in a common support plane for receiving and transporting objects such as a cargo container 24. Any other item which is to be moved or stored, and which includes a generally flat bottom surface, such as shown at 25, may be handled by the present invention, but for purposes of simplicity reference will be made hereinafter simply to "containers."

The vertical dimension between the support plane of the rollers 22 and the sub-base 21 is relatively small. This provision primarily is for the purpose of space saving.

Figure 2:
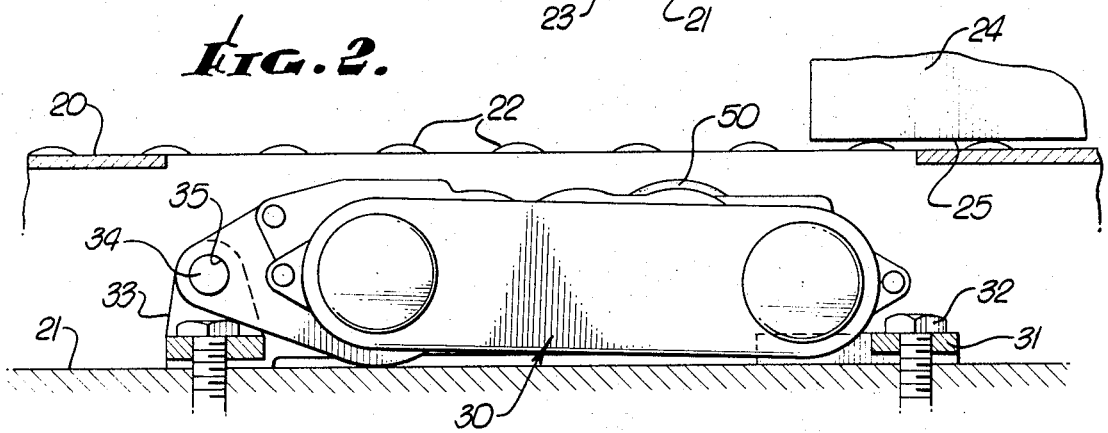
FIG. 2 is a somewhat enlarged side elevation of the drive roller unit with parts of the environment in section, as taken on the line 2—2 of FIG. 1. In this view the unit is dropped down out of operating position.

A planetary power roller unit generally designated 30 is mounted in the aisle 23. It lies entirely below the support plane of the rollers when not in operation, as shown in FIG. 2, and a drive roller thereof, hereinafter described in more detail, is forced upwardly into contact with the container 24 when in operation.

The unit comprises a stationary frame 31 which may be bolted down, as shown at 32, upon the sub-base 21. The frame incorporates at one end thereof spaced apart standards 33 which provide mounts for pivot pins 34. These pins extend into journals 35 of a secondary frame 36. The secondary frame is thus pivotally anchored at one end on a horizontal axis and is free to be swung up and down.

Figure 3:
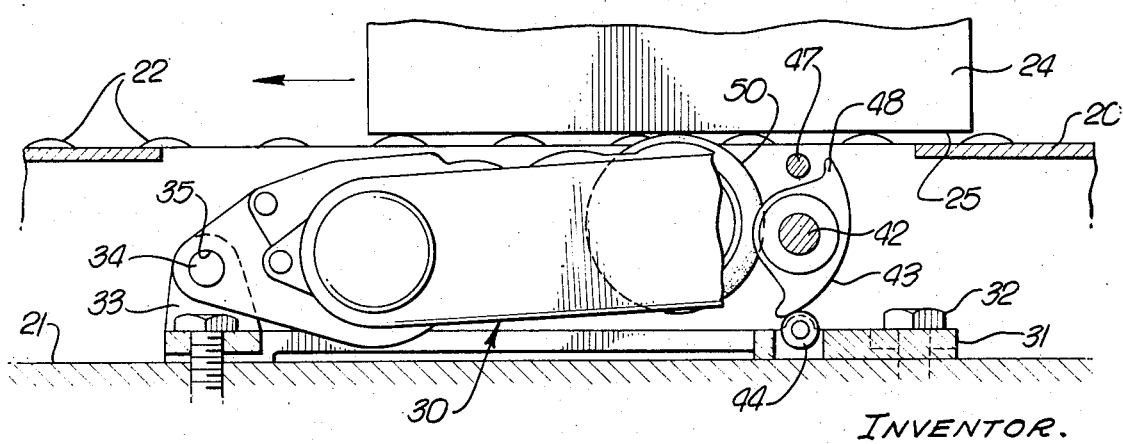
FIG. 3 is a view similar to FIG. 2 with parts broken away. In this view the unit is pivotally elevated with the drive roller in contact with a container.
Figure 4:
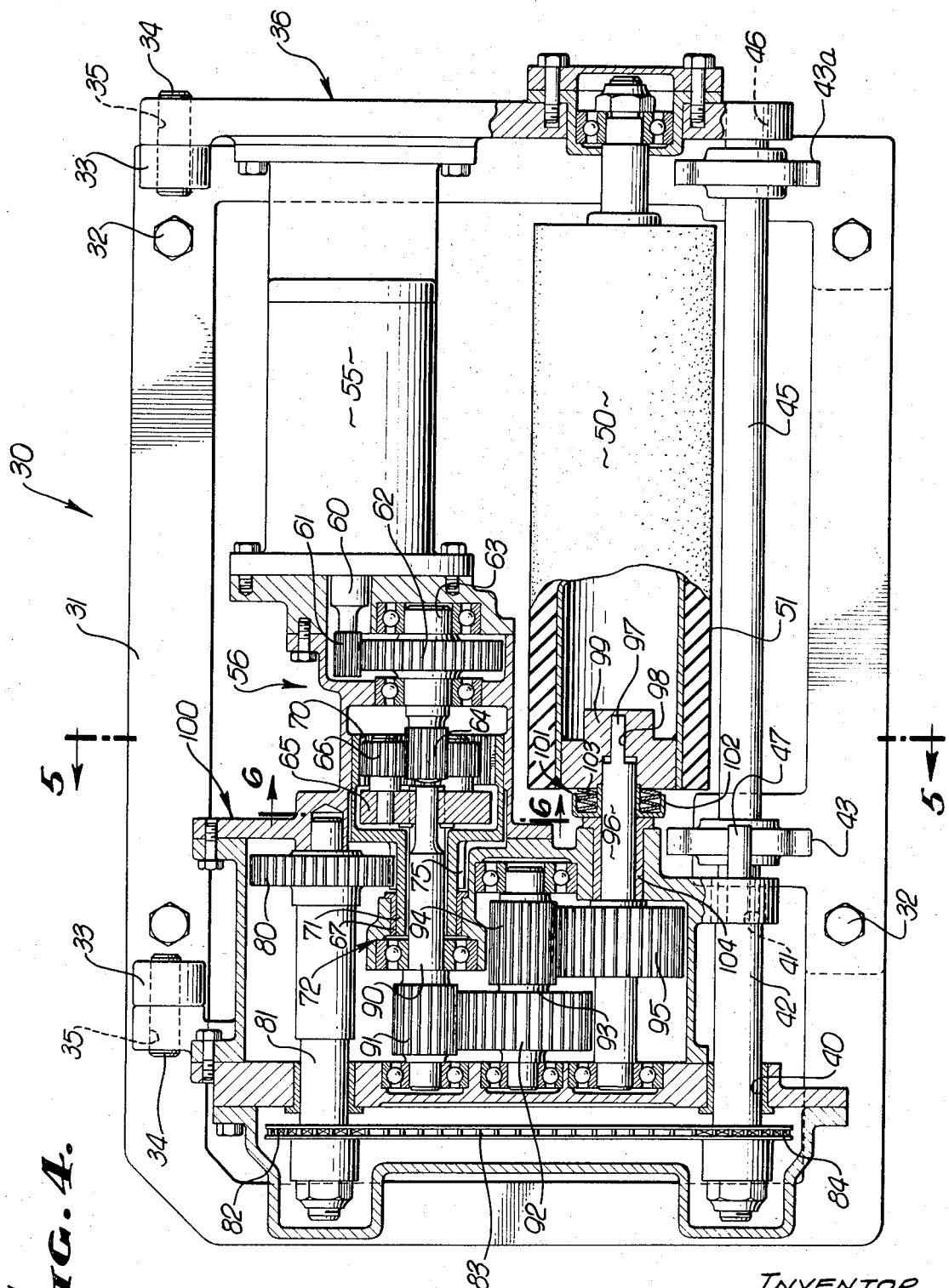
FIG. 4 is a top plan view, partly in section with top parts of housing omitted, showing the operating mechanism of the unit.

The secondary frame incorporates journals 40 and 41 supporting a shaft 42, at the inner end of which is carried a butterfly or double lobed cam 43. This cam bears against a follower in the form of a freely rotatable roller 44 which is mounted in the primary or stationary frame 31. A cam shaft 45 extends from the cam 43 to a similar cam 43a, the shaft 45 being journaled at 46 in the secondary frame. When the cams are fractionally rotated one way or the other from the neutral position shown in FIG. 5 they will raise the end of the unit opposite the pivotal mounting until the roller hereinafter described comes into driving contact with the container. Stop pins 47 are engageable with either end 48 of the cams to limit the rotational movement of the latter as shown in FIG. 3.

The drive roller 50 is mounted in the secondary frame near the end opposite the pivotal anchors. This roller preferably is surfaced with rubber or other resilient material 51, affording a frictional driving surface. By virtue of the relationship between the axis of the drive roller 50 and the relative position of journals 35, the center of gravity of the planetary power roller unit 30 is disposed between the roller axis and journals 35.

For operation, the object is to elevate this roller into container engaging position, and when idle be permitted to drop down out of engagement. The mechanism to turn the cams for accomplishing these objectives will next be described.

A prime source of power, such as an electric motor 55 is mounted upon the secondary frame 36. Extending from the motor is a gear box generally indicated at 56. Within this gear box and keyed to the motor shaft 60 is a pinion 61 which drives a gear 62. Shaft 63 of the gear 62 carries a sun gear 64 which is part of a planetary gear set. This planetary gear set includes a cage 65 mounting three planet gears 66 which mesh with the sun gear. The planet gears also mesh with a ring gear 70. The latter is in the form of an annular shell which encloses cage 65 and embodies a sleeve 71 of reduced diameter supported in a journal 67 which is included in a bearing assembly 72. The sleeve incorporates a pinion 75. The ring gear 70 is not fixed in the gear box but is free to rotate therein, subject to a drag brake action in the roller assembly, later described. However, the rotation is of very small magnitude, being utilized to transmit torque to the cams for fractionally rotating the latter.

This function is achieved by meshing of the pinion 75 with a gear 80, a shaft extension 81 of which carries a sprocket 82. A roller chain 83 is trained over the sprocket and in turn engages a sprocket 84 keyed to the shaft 42.

Thus, when the motor 55 is started, the sun gear 64 through the planet gears 66, start to rotate the ring gear 70. Rotation is thus imparted to the cams 43 and 43a but the extent is very slight because the roller rises into driving contact with the container, and at a maximum height (usually when the container has passed by the roller) the ends 48 of the cams engage the stops 47. The stops 47 are principally for safety purposes, in limiting the elevation of the roller before or after the container is in engagement with it. The roller should come into contact with the bottom of a container before reaching its maximum elevation. Compensation is also automatically provided for irregularities in the bottom of a container or object being moved.

The elevation of the roller occurs very rapidly, whereupon the ring gear of the planetary set is restrained against additional rotation. Consequently, the cage 65 of the planetary set transmits rotary power to a shaft 90 to which it is keyed. This shaft imparts rotation to a pinion 91, which meshes with a larger gear 92. The gear 92 has a common shaft 93 with a pinion 94 which meshes with a larger gear 95. The train of gears described provides a reduction system which delivers relatively slow rotation through a shaft 96 to the roller 50, through the medium of a flattened shaft section 97 keyed in a slot 98 of an end plug 99 forming part of the roller construction.

Various shafts throughout the system are properly journaled in bearing assemblies, examples of which are illustrated, and the gears are enclosed within a housing generally designated 100, of which the gear box 56 is a part.

A drag brake generally indicated at 101 is provided to hold back the roller initially sufficiently to cause the cams to rotate. If the roller drive is more free than the drive to the cams, the cams will not turn and the roller will not rise. The brake assures that the cam drive turns more freely than the roller drive. The brake includes a shoe 102 retaining Belleville springs 103, bearing at one end against the roller end plug 99. The shoe in turn presses against a flanged journal 104 mounted in the housing 100 and rotatably supporting shaft 96. The brake is designed to provide the necessary drag for the cam to be rotated but not sufficiently great to require any release during operation of the roller. Other types of springs, and other forms of brake may be employed, and located as desired, so long as the function is retained.

When the motor is intentionally stopped, or a power failure occurs, rotary drive to the roller ceases. Concurrently, the planet gears 66, being idlers, cease any tendency to influence the ring gear 70. The latter is without power, and offers no resistance to return of the elevated (roller) end of the secondary frame to its lowered position by gravity through its own weight.

The mechanism shown and described achieves a function of utmost importance, namely, that the lifting force on the cams, resulting in pressure of the power roller against the bottom of the containers, is proportional to the driving torque on the roller. Thus, the more demanding the load, the more vertical up pressure forces will be imposed. This is a straight line function to give assurance of positive traction equal to the required torque.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

What is claimed is:

1. A low-profile power roller mechanism for propelling movable objects along a supporting surface comprising: a drive roller, means mounting said roller adapted selectively to position the roller in a lowered condition entirely below the plane of the supporting surface so as to be out of contact with the object or in an elevated condition with its periphery tending to encroach into the plane of the supporting surface so as to be in traction with the object, a source of rotary power, means transmitting rotary motion from said power source to the roller to drive the same, and means including a torque element operated by said power source to shift said roller from a lowered condition to said elevated condition and to impose a lifting force on the roller proportional to the driving force on the roller required to move the object, and means for limiting the shifting movement of said roller substantially beyond said elevated condition.

2. A mechanism as defined in claim 1 in which the means to shift and impose a lifting force on the roller includes a cam, and means between the torque element an the cam to turn the latter.

3. A mechanism as defined in claim 2 in which the means to shift and impose a lifting force on the roller includes a planetary gear set, and the torque element is a ring gear in the gear set free to turn a limited amount.

4. A mechanism as defined in claim 2 in which the means transmitting rotary motion includes a reduction gear train.

5. A mechanism as define in claim 3 in which the means transmitting rotary motion includes a cage in the planetary set coupled with a reduction gear train.

6. A mechanism as defined in claim 1 in which the means mounting the roller includes a stationary frame, and a secondary frame, a pivotal mounting supporting a portion of the secondary frame on the stationary frame enabling a portion of the secondary frame removed from the pivotal mounting to rise or fall, the roller being journaled in the last named portion of the secondary frame.

7. A mechanism as defined in claim 6 in which the means to shift and impose a lifting force on the roller includes a cam, and means between the torque element and the cam to turn the latter.

8. A mechanism as defined in claim 7 in which the cam is journaled in the secondary frame, a cam roller is journaled in the stationary frame, and the cam rides on the cam roller.

9. A mechanism as defined in claim 8 in which a stop element is fixed in the stationary frame, and the cam embodies a latch portion adapted to engage the stop element to limit rotation of the cam and thereby limit action of the torque element.

10. A mechanism as defined in claim 9 in which the power source is reversible, and the cam is double lobed having a neutral position and turnable for either lobe to engage the cam roller.

11. A mechanism as defined in claim 3 in which the ring gear is disposed within a housing and its rotation is unrestrained by the latter, a transmission system couples the ring gear and the cam, the torque of the ring gear being delivered by the transmission system to actuate the cam, and means cooperating with the cam to restrict actuation thereof and retard or limit rotation of the ring gear.

12. A mechanism as defined in claim 11 in which a cage of the planetary gear set delivers rotary power to the drive roller when the ring gear is retarded or its rotation limited.

13. A power roller mechanism for propelling movable objects along a supporting surface comprising: a drive roller, means mounting said roller adapted selectively to position the roller in a lowered condition entirely below the plane of the supporting surface so as to be out of contact with the object or in an elevated condition with its periphery tending to encroach into the plane of the supporting surface so as to be in traction with the object, a source of rotary power, means transmitting rotary motion from said power source to the roller to drive the same, and means including a torque element operated by said power source to shift said roller from a lowered condition to an elevated condition and to impose a lifting force on the roller proportional to the driving force on the roller required to move the object, the means to shift and impose a lifting force on the roller including a cam, means between the torque element and the cam to turn the latter, a planetary gear set, the torque element being a ring gear in the gear set free to turn a limited amount, and means coupled with the roller to impose a resistance to rotation when the roller is out of contact with the object to be moved greater than resistance to rotation concurrently offered by the cam.

14. A mechanism as defined in claim 13, in which the last named means is a drag brake.

15. In a power roller mechanism for propelling loads along a platform having freely rotatable means for supporting such loads along a laterally extending plane thereon a rotatable drive roller having an axis disposed parallel to said plane, means for supporting said roller for translatory movement under power into, and for free gravitational movement out of a position in which it is tangential to said load plane and in tractional engagement with a load supported thereon comprising a pivotal mounting for said supporting means laterally displaced from said roller axis; said supporting means having its center of gravity located between said pivotal mounting and said roller axis whereby gravity is effective to normally maintain said roller out of its position tangential to said load plane and out of tractional engagement with a load supported thereon, power means effective upon operation to rotate said roller on its axis and to actuate said supporting means to cause the same to translate said roller into its position tangential to said load plane and in traction with a load supported thereon, and effective upon cessation of operation to permit gravitational return of said supporting means to remove said roller from said position.

16. A power roller mechanism according to claim 15 in which the means operable by said drive train comprises gearing operable to concurrently supply rotational and translatory propulsion to said roller, and responsive to arrest of translation of said roller by a load supported by said supporting means to continue to supply rotational propulsion to said roller.

17. A power roller mechanism according to claim 16 in which said gearing includes a sun gear, planet gear and ring gear.

18. A power roller mechanism according to claim 16 including means for braking rotational movement of said roller in all positions thereof and in which said gearing is responsive to said braking means to supply translatory propulsion to said roller to bring the same to said position tangential to said load plane.

* * * * *